United States Patent
Haggar et al.

(10) Patent No.: US 9,324,021 B2
(45) Date of Patent: Apr. 26, 2016

(54) AVOIDING NON-INTENTIONAL SEPARATION OF AVATARS IN A VIRTUAL WORLD

(75) Inventors: Peter Frederick Haggar, Raleigh, NC (US); Brian Ronald Bokor, Raleigh, NC (US); Andrew Bryan Smith, Morrisville, NC (US); Daniel Edward House, Raleigh, NC (US); William Bruce Nicol, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1167 days.

(21) Appl. No.: 12/208,786

(22) Filed: Sep. 11, 2008

(65) Prior Publication Data

US 2010/0060649 A1 Mar. 11, 2010

(51) Int. Cl.
*A63F 13/00* (2014.01)
*G06F 3/048* (2013.01)
*G06N 3/00* (2006.01)
*A63F 13/30* (2014.01)
*G06Q 30/02* (2012.01)

(52) U.S. Cl.
CPC ............ *G06N 3/006* (2013.01); *A63F 13/12* (2013.01); *A63F 2300/5553* (2013.01); *A63F 2300/5566* (2013.01); *A63F 2300/5573* (2013.01); *A63F 2300/5586* (2013.01); *G06Q 30/02* (2013.01)

(58) Field of Classification Search
USPC ........................................................ 345/419
See application file for complete search history.

(56) References Cited

U.S. PATENT DOCUMENTS

| | | | | |
|---|---|---|---|---|
| 6,215,498 B1* | 4/2001 | Filo et al. | ...................... | 345/419 |
| 2006/0084499 A1* | 4/2006 | Moshal | ........................... | 463/25 |
| 2007/0063999 A1* | 3/2007 | Park | ............................. | 345/419 |
| 2007/0226063 A1* | 9/2007 | Hanson | .......................... | 705/15 |
| 2007/0233291 A1* | 10/2007 | Herde et al. | .................... | 700/91 |
| 2008/0030496 A1* | 2/2008 | Lee et al. | ....................... | 345/418 |
| 2008/0081701 A1* | 4/2008 | Shuster | .......................... | 463/42 |
| 2009/0172108 A1* | 7/2009 | Singh | ............................ | 709/206 |
| 2009/0267938 A1* | 10/2009 | Nicol et al. | ................... | 345/419 |
| 2010/0317442 A1* | 12/2010 | Thomas | ................ | G06Q 30/02 463/42 |

OTHER PUBLICATIONS

M. Masa and J. Zara, "From Textual Chats to Interest Groups in 3D Virtual Space", 2002, Eurographics Association 2002.*
Bonnie Nardi and Justin Harri, "Strangers and friends: collaborative play in world of warcraft", Proceedings of the 2006 20th anniversary conference on Computer supported cooperative work (CSCW '06). ACM, New York, NY, USA, 149-158.*

* cited by examiner

*Primary Examiner* — Yingchun He
(74) *Attorney, Agent, or Firm* — Moore & Van Allen PLLC

(57) ABSTRACT

A method for avoiding non-intentional separation of avatars in a virtual world may include detecting a first avatar seeking to enter a first location and determining if a second avatar is related to the first avatar based on a first predetermined rule. The method may also include determining that the first and second avatars are seeking to enter the first location together. The method may further include determining whether to allow the first avatar and the second avatar to enter the first location based on a second predetermined rule.

10 Claims, 4 Drawing Sheets

AVOIDING NON-INTENTIONAL SEPARATION OF AVATARS IN A VIRTUAL WORLD

BACKGROUND OF THE INVENTION

The present invention relates to simulations, virtual world simulations of the real-world or real-life or a virtual world and the like, and more particularly to a system and method for avoiding non-intentional separation of avatars to keep associated avatars together while traversing locations in a virtual world.

Computer based simulations are becoming more ubiquitous. Simulations may be used for training purposes, for entertainment or for other purposes. Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents through their avatar can explore the virtual world, meet other users or residents, socialize, participate in individual and group activities, create and trade items (virtual property) and services from one another.

Although virtual worlds are filled with users from many different geographic locations, different cultures, and different ethnic groups, virtual worlds provide many different environments for users to interact and meet one another. Furthermore, many users are likely already acquainted with other users from everyday life. These users can associate their respective avatars with other avatars. Once they enter a virtual world, their avatars can roam different parts of the virtual world together and even enter virtual spaces, virtual stores or other virtual locations together.

BRIEF SUMMARY OF THE INVENTION

In accordance with an aspect of the present invention, a method for avoiding non-intentional separation of avatars in a virtual world may include detecting a first avatar seeking to enter a first location. The method may also include determining if a second avatar is related to the first avatar based on a first predetermined rule. The method may further include determining that the first and second avatars are seeking to enter the first location together. The method may also include determining whether to allow the first avatar and the second avatar to enter the first location based on a second predetermined rule.

In accordance with another aspect of the present invention, a method for avoiding non-intentional separation of avatars in a virtual world may include identifying a first avatar proximate to a first location in a virtual world. The method may also include identifying at least one other avatar proximate to the first avatar and identifying a reciprocal relationship between the first avatar and the at least one other avatar proximate to the first avatar. The method may also include determining that allowing the first avatar and the at least one other avatar proximate to the first avatar and having a reciprocal relationship to the first avatar to enter the first location would exceed a maximum number of avatars allowed in the first location. The method may further include moving the first avatar and the at least one other avatar proximate to the first avatar and having a reciprocal relationship to the first avatar to a second location when the avatars attempt to enter the first location.

In accordance with a further aspect of the present invention, a system for avoiding non-intentional separation of avatars in a virtual world may include a processor. The system may also include a module operable on the process to detect a first avatar seeking to enter a first location and a module operable on the processor to determine if a second avatar is related to the first avatar based on a first predetermined rule. The system may further include a module operable on the processor to determine that the first and second avatars are seeking to enter the first location together. The system may also include a module operable on the processor to determine whether to allow the first avatar and the second avatar to enter the first location based on a second predetermined rule.

In accordance with still a further aspect of the present invention, a computer program product for avoiding non-intentional separation of avatars may include a computer useable medium having computer useable program code embodied therein. The computer useable medium may further include computer useable program code configured to detect a first avatar seeking to enter a first location, and computer useable program code configured to determine if a second avatar is related to the first avatar based on a first predetermined rule. The computer useable medium may also include computer useable program code configured to determine that the first and second avatars are seeking to enter the first location together. The computer useable medium may further include computer useable program code configured to determine whether to allow the first avatar and the second avatar to enter the first location based on a second predetermined rule.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
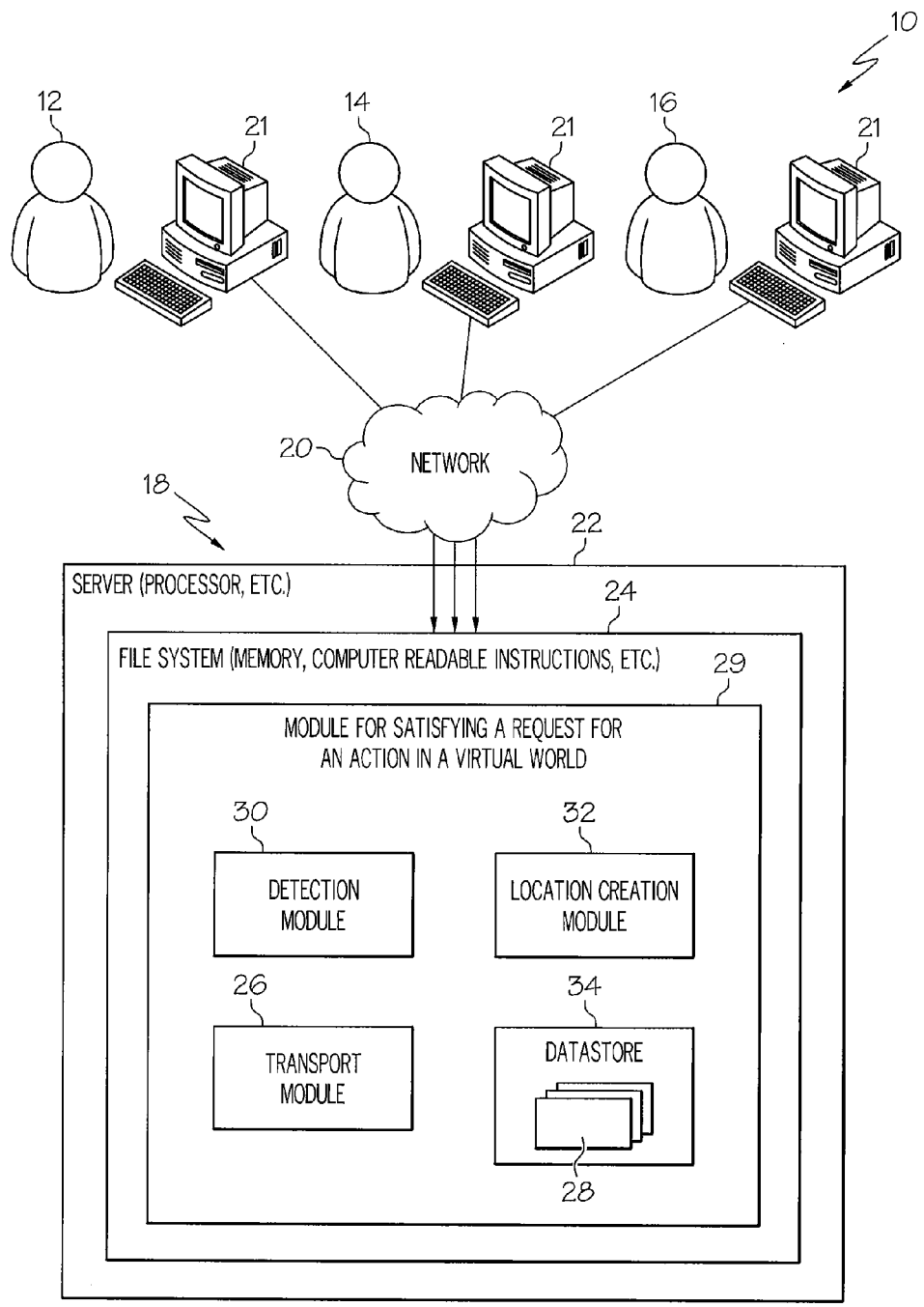
FIG. 1 is a block schematic diagram of an example of a system for avoiding non-intentional separation of avatars in a virtual world in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Aspects of the present invention provide systems, methods, and computer program products for avoiding non-intentional separation of avatars in a virtual world. Specifically, aspects of the present invention may involve detecting a first avatar seeking to enter a virtual world location. A virtual world location may be any type or form of virtual space in a virtual world, such as, for example, a store, a business, an arena, a building, a land area, an open space, a room, etc. Some aspects, if needed, determine whether a second avatar related to the first avatar is seeking to enter the same virtual location. This determination can be repeated for subsequent avatars if there are multiple avatars seeking to enter the virtual location. Depending on the embodiment, the situation is analyzed against predetermined rules to determine whether both the first avatar and second avatar can enter the first location or whether a substantially identical location needs to be created and they need to be transferred to the substantially identical location.

As an example, non-intentional separation of avatars may occur when a first avatar and any number of associated avatars attempt to enter a virtual world location, but the location does not have capacity for all of them together. A substantially identical location can be dynamically created and all avatars could be transported to the new location. From their respective displays, the associated avatars will be in a virtual world location substantially identical to the one they sought to enter and they will remain together as they attempted to enter.

The predetermined rule of capacity is used throughout for illustration purposes and is not meant to limit the different rules, as there are many other rules that can be established for a virtual location. For example, owners or managers of a virtual location may set a threshold for the number of avatars that are allowed in the virtual location at any given time to limit overcrowding. A threshold number of avatars may be related to a number for ideal avatar capacity for the virtual location or maximum avatar capacity for the virtual location. There are many other rules that can be used for a virtual location. For example, the owners or managers of the virtual location can set a threshold number of avatars based on other factors such as, for example, how large the area is (e.g., the larger the area the more avatars it can hold at one time and still have a positive user experience), how large the server capacity is that is hosting the virtual location, etc. Other than size capacity, other rules may dictate entry into a virtual location. For example, an owner or manager may specifically exclude particular avatars or types of avatars from a virtual location, which would, in turn, dictate that not all of a group may enter a virtual location if some in the group are specifically excluded.

As another example, avoiding non-intentional separation of avatars may occur when one or more associated avatars are proximate to a virtual world location in which another one or more associated avatars are located. The system can notify any of the avatar(s) (the ones outside or inside or both), and ask them if they would like to join, and if so, determine location capacity and if their presence would exceed capacity, dynamically create a new, substantially identical location and transport all associated avatars.

FIG. 1 is a block schematic diagram depicting a general embodiment of an environment 10 in which aspects of the present invention may be implemented according to at least one embodiment. As illustrated, a plurality of users 12-16 may be connected to a network 20, such as the Internet, LAN, WAN, etc. The users 12-16 interact with a virtual world system 18. In particular, the virtual world system 18 may operate one or more virtual worlds in which users 12-16 may create one or more virtual personalities, sometimes referred to as avatars. The users, via their respective computers 21, are capable of controlling their avatars to communicate with each other in various virtual scenarios. In general, users provide commands to the virtual world system 18 dictating various environments and situations to place their associated avatar(s) in and to control the actions and movements of the avatar. The virtual world system 18 receives these inputs and generates various graphic user interfaces (GUIs) to be displayed on each user's computer. Where users interact with each other in the virtual world, the virtual world system 18 displays scenes from the users' interactions on both users' computers.

As illustrated, the virtual world system 18 is typically implemented as a server/processor 22 accessible via the network 20. This however, could include peer-to-peer type network configurations without a central host. (FIG. 1 depicts only one possible embodiment for configuration of the virtual world system.) The server/processor 22 operates using various software modules stored in a file system 24 to create and operate the virtual world. The virtual world system 18 also includes data stored in the file system 24 typically in a datastore 34.

In one embodiment, the datastore 34 of the virtual world system 18 may comprise data records 28 for each user and each avatar for each user, if the user has more than one avatar. While various data may be stored for each user and each user's avatar, for purposes of this invention, at least data are stored for each avatar regarding any friends or acquaintances or any other reciprocal or related avatars associated with each avatar of the user, and also recent communication history, hobbies, interests, etc. that would dictate non-separation guidelines for the avatars.

In the embodiment, the data records 28 may further comprise rules associated with anything including specific avatars, specific locations or even the entire virtual world. These rules may further comprise a set of non-separation rules based on separation preferences. These rules may also comprise rules associated with one or more virtual world locations, such as capacity rules, proximity rules, avatar exclusion rules, etc. These rules may be either user-defined rules or default rules that can be assigned to all avatars, locations or virtual worlds.

The system 18 may further include a detection module 30 for detecting avatars and associated avatars in a virtual world. In some embodiments, the system 18 further includes a transport module 26 and a location creation module 32. An example of replicating, spawning or creating a new virtual space or location when an original virtual space or location reaches a maximum capacity that may be used for location creation module 32 is described in U.S. patent application Ser. No. 11/947,829 entitled "Automatic Increasing of Capacity of a Virtual Space in a Virtual World," which was filed on Nov. 30, 2007, which is assigned to the same assignee as the present invention and incorporated herein in its entirety by reference.

The system 18 may further include computer readable instructions in the file system 24 so that modules can reference and query each other (when guided by the server/processor 22), and send pertinent information to each other in order to perform the systems, methods and processes of the present invention.

In some embodiments, the data records 28 are stored in the datastore 34 accessible by the detection module 30. In this embodiment, the rules may be stored in a simple file or may be stored in a relational datastore. In some embodiments, the rules are in the form of a rules engine embedded in the detection module 30.

Figure 2:
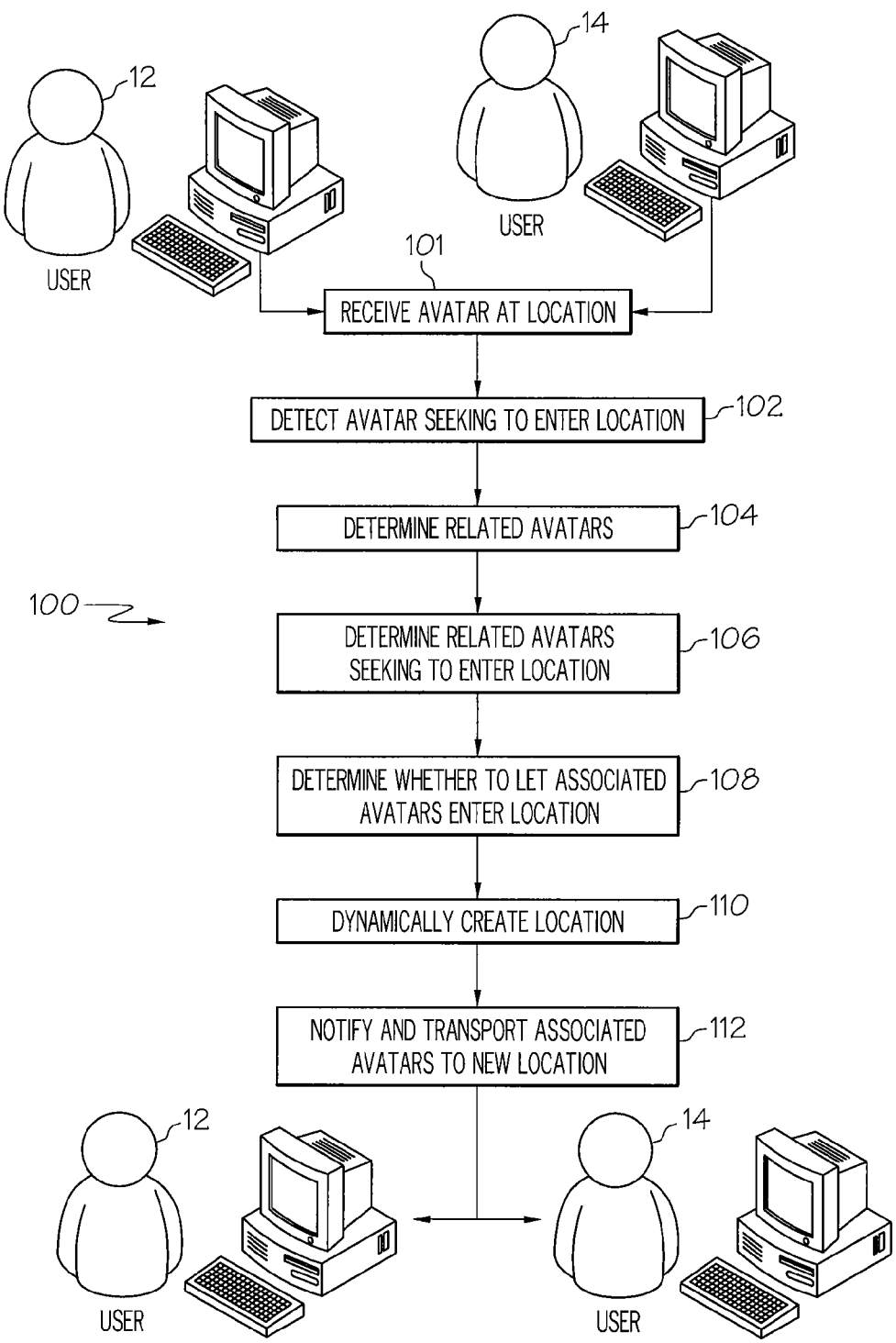
FIG. 2 is a flow chart of an example of a method for avoiding non-intentional separation of avatars in a virtual world where a first avatar and a second avatar associated with the first avatar attempt to enter a virtual world location in accordance with an embodiment of the present invention.

FIG. 2 is a flow chart illustrating an example of a method 100 for avoiding non-intentional separation of avatars in a virtual world in accordance with an embodiment of the present invention. This embodiment illustrates a situation where a first avatar and second avatar seek to enter a virtual world location. Further, in this embodiment, the invention uses a central datastore of rules and determines which avatars seeking to enter are associated and whether the location has capacity for all associated avatars seeking to enter. If there is not capacity, in this embodiment, the method may dynamically create a substantially identical location and transport all associated avatars seeking to enter the location to the dynamically-created, substantially identical location.

In this embodiment, a first user 12 and a second user 14 direct their associated first and second avatars to a virtual world location. (The second avatar could be associated with the first user, as opposed to another user.) (FIG. 2, Block 101). The server/processor 18, through the detection module 30, detects the presence of the first avatar and recognizes that the first avatar is attempting to enter the location. (FIG. 2, Block 102).

The detection operation can be performed in a number of different ways. For example, the detection module 30 may detect all avatars within a proximity of the virtual world location. This proximity can be user-defined or a default value particular to the location, virtual world or anything else. As an alternative, the detection module 30 may receive an indication from the avatar that it desires to enter the location. The avatar may indicate its intent to enter the location with any visual, textual or oral communication or gesture in a virtual world that an avatar may perform.

In this particular embodiment, once the detection module 30 determines that the first avatar is seeking to enter the location, the detection module 30 determines all avatars associated with the first avatar. (FIG. 2, Block 104).

The detection module 30 can perform the determination function in a number of different ways. For example, it may query the datastore 34 for the first avatar's friend list and compare the avatars on the friend list to all surrounding avatars to see if there is a match. As another example, the detection module 30 may query the datastore 34 for associated friend rules—e.g., all avatars within a certain distance (e.g, 5 feet) are treated as associated avatars, and determine associated avatars based on these rules. A final example may include the detection module 30 recognizing any visual, textual or oral communication or gesture performed between the first avatar and proximate avatars and determining that they are associated in this way.

The server/processor 22, through the detection module 30, may determine whether any identified associated avatars are seeking to enter the same virtual world location. (FIG. 2, Block 106). It can accomplish this function in a number of ways as discussed above. Please note that the function of determining the associated avatars and determining whether they are attempting to enter the location are interchangeable. For example, the server/processor 22 can first determine all of the avatars seeking to enter the location, and then determine if any of those avatars are associated with the first user's avatar.

In this embodiment, once the detection module 30 has determined all of the associated avatars seeking to enter the location, it may then determine whether allowing the associated avatars to enter would violate a rule associated with the virtual location, such as exceeding the location's capacity. (FIG. 2, Block 108). Please note that there may be other reasons why all associated avatars would not be allowed in the store together besides capacity, such as for example, Religious groups, solicitors, possible gang related associations, legal (restraining order) issues, etc.

For example, if three (3) associated avatars seek to enter a location which has a maximum capacity of 30 avatars, and already has 29 avatars, the 3 associated avatars should not be let into that location. The maximum capacity can be a default value or it can be user-defined, such as, for example, set by the location's owner or manager. The detection module 30 may query the datastore 34 to determine the location's maximum capacity.

Continuing with the over-capacity example of this embodiment, the detection module 30 may then pass computer readable instructions and data to the location creation module 32. The location creation module 32 may then dynamically create a location substantially identical to the one the associated avatars seek to enter similar to that described in U.S. patent application Ser. No. 11/947,829.

The transport module 26 may notify the users, through a transport request, that they are all going to be transported to another location which can accommodate all of them. (FIG. 2, Block 112). The notification may be in any form, including a GUI display. For example, the server/processor 22 creates proper GUIs and transmits them to the computers 21 associated with the users of the avatars for display.

The notification/transport request GUI may further include a feature where the avatars' respective users can either accept or decline the transport request. In this example, assuming that all avatars accept the transport request, they will all be transported by the transport module 26 to the substantially identical location together. If one or more avatars decline, the server/processor 22 may repeat the determination function 108 with the remaining associated avatars.

Figure 3:
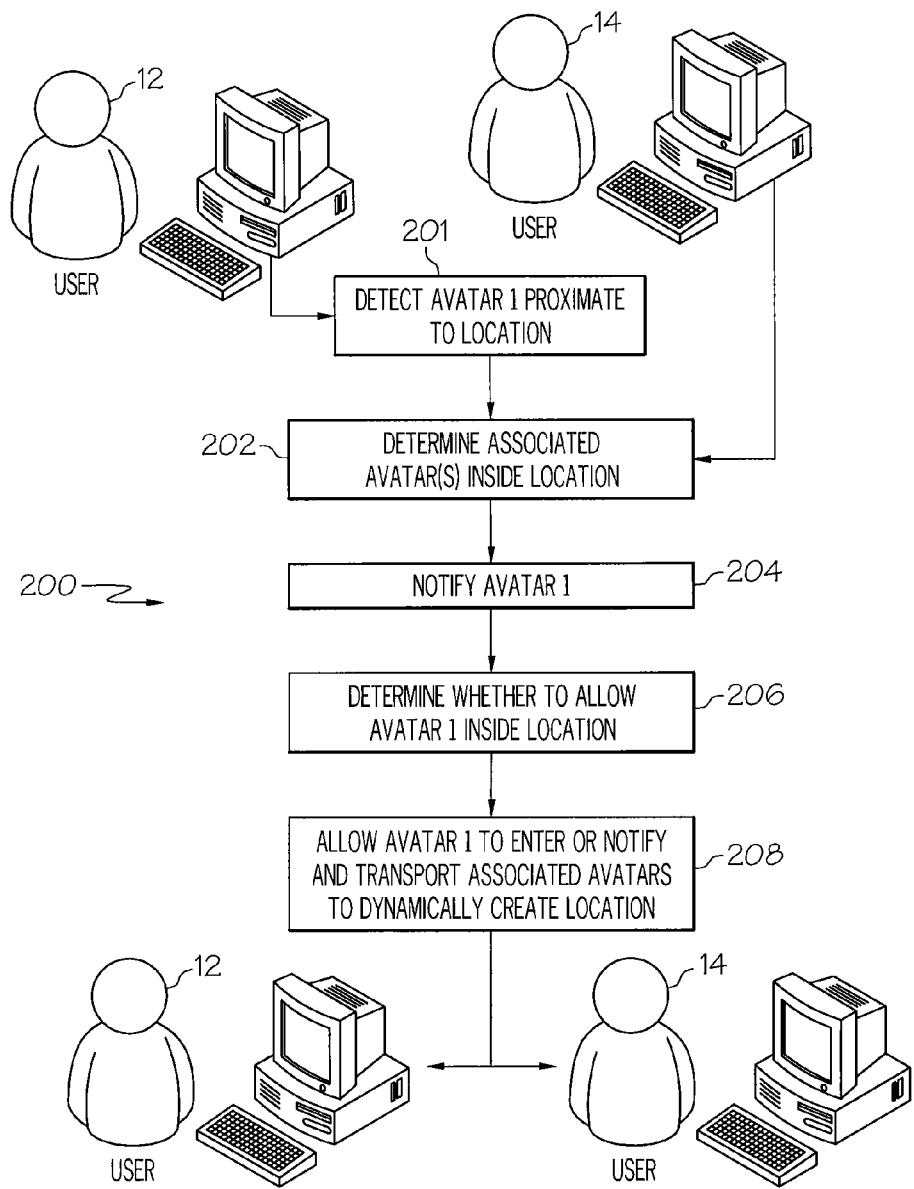
FIG. 3 is a flow chart of an example of a method for avoiding non-intentional separation of avatars in a virtual world where a first avatar is proximate to a virtual world location in which a second associated avatar is located in accordance with an embodiment of the present invention.

FIG. 3 is a flow chart illustrating an example of a method 200 for avoiding non-intentional separation of avatars in a virtual world in accordance with another embodiment of the present invention. This embodiment illustrates a situation where a first avatar is proximate to a virtual world location in which another associated avatar(s) is located, but they together or individually are not aware of this. In this embodiment, the invention can identify the first avatar's associated avatar(s), determine whether any are currently located in the location and notify the first and/or second avatars, and to determine whether the first avatar would like to enter.

In this embodiment, a first user 12 and a second user 14 have associated avatars. The server/processor 22 first, through the detection module 30, detects the first avatar. (FIG. 3, Block 201). The detection module 30 may query the datastore 34 for proximity rules such as for example all avatars within 5 feet of a location, and for example, may simply detect all avatars that fall within the rule. There are numerous other ways in which the detection module 30 may detect the first avatar. Please note that the detection module 30 need not detect the first avatar's desire to enter the location.

Once the server/processor 22 detects a first avatar via the detection module 30, the detection module 30 may determine whether an avatar associated with the first avatar is inside the location, user 14's avatar in this example. (FIG. 3, Block 202). For example, the detection module 30 may query the first avatar's friend list and compare it to the avatars already inside the location (or vice-versa). As another example, the detection module 30 may query the datastore 34 for data specific to the first avatar and determine their recent contacts to determine if there has been contact with any avatar located in the store. In another example, the detection module 30 may compare the avatar's friend list against the friend lists of the avatars in the store to determine if they have associated friends in common.

If the detection module 30 determines that the first avatar has an associated avatar inside the store, the server/processor 22, through the transport module 26, can create a GUI and notify the first avatar of the association, and give them the option of entering the store. (FIG. 3, Block 204).

In some embodiments, the transport module 26 may notify the second avatar (user 14's avatar) of the association, and allow them to extend a personal invitation to the first avatar (user 12's avatar) to join them in the location.

If the first avatar decides to enter the location, the server/processor 22 performs the operations to determine whether the first avatar can enter the location. (FIG. 3, Block 208). If the first avatar cannot enter without violating a rule (e.g., maximum capacity), then the location creation module 32 may dynamically create a substantially identical location, and the transport module 26 may notify and transport the associated avatars to the dynamically-created location as described above.

Figure 4:
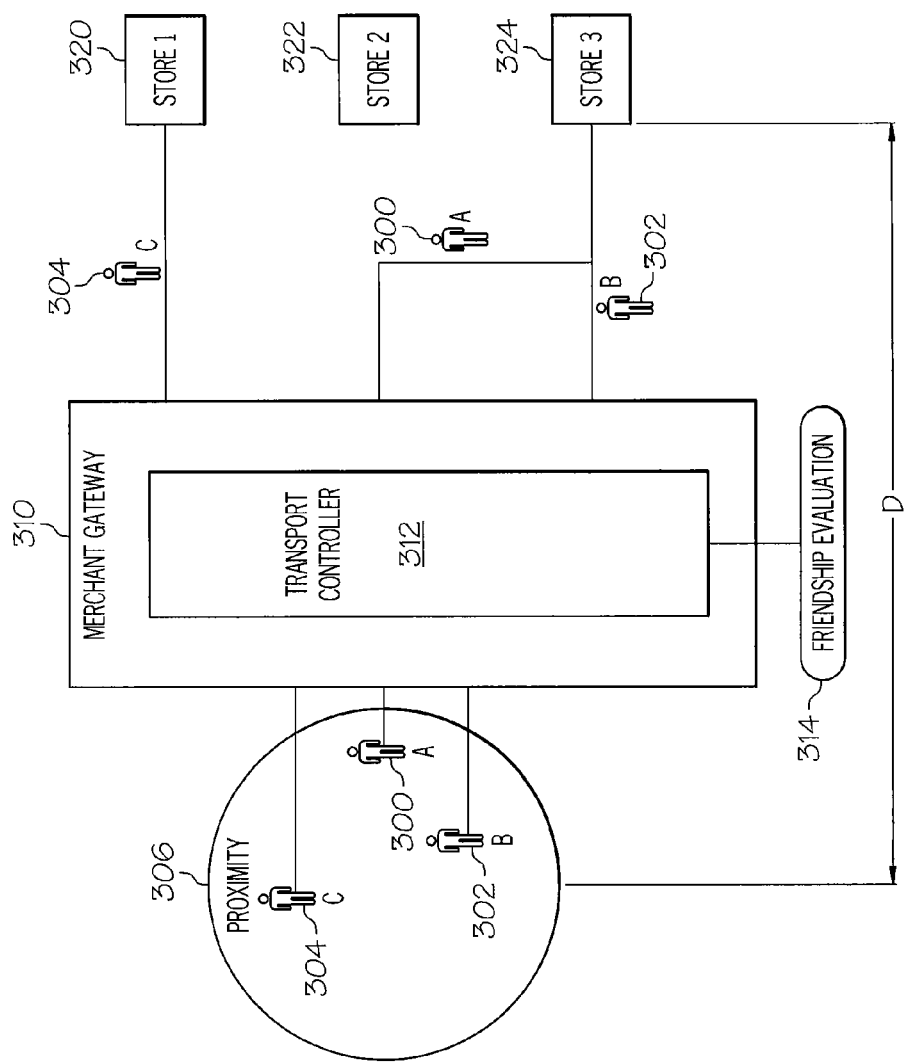
FIG. 4 is a diagram of an example of avoiding non-intentional separation of avatars according to an embodiment of the present invention.

FIG. 4 shows a diagram of avoiding non-intentional separation of avatars in a virtual world according to an example embodiment of the present invention. The diagram shows avatar A 300, avatar B 302, and avatar C 304 in a predetermined proximity 306 of each other and within a predetermined proximity or distance "D" of Store 1 320 and Store 2 322. In this embodiment, avatar A 300 and avatar B 302 are associated avatars or have a relationship, such as the avatars may be on each others friend list or other relationship similar to that described herein. Avatar C 304 is this example does not have a relationship with avatar A 300 and avatar B 302. All of the avatars are seeking to enter Store 1 320.

In this embodiment, a Merchant Gateway 310 of either Store 1 320 or Store 2 322 may detect avatars A 300, B 302 and C 304 within the predetermined proximity 306 of each other and within the proximity or distance "D" of its associated store, Store 1 320. In this example, the proximity 306 is illustrated as a circular area. For example, the proximity 306 can be defined as all avatars within a circular area defined by a radius of ten feet. In this embodiment, the Merchant Gateway 310 for Store 1 320 detects all avatars, determines whether the avatars are seeking to enter the store and then determines whether the avatars are associated using a Friendship Evaluation module 314. The Merchant Gateway 310 and Friendship Evaluation module 310 may perform functions similar to those described with respect to the method illustrated in FIG. 2. Similarly, the Merchant Gateway 310 for Store 1 320 could first detect avatar A 300 seeking to enter the store, determine its associated avatar B 302 using Friendship Evaluation 314, and repeat the process for avatar C 304. (See FIG. 2, Blocks 102-106). The Merchant Gateway 310 for Store 2 322 will also perform similar functions, but will end its inquiry when it determines that none of the avatars are seeking to enter Store 2 322.

Once the Merchant Gateway 310 determines that avatar A 300 and avatar B 302 are seeking to enter Store 1 320, it can determine whether to allow them to enter based on a predetermined rule such as, for example, store capacity. (See FIG. 2, Block 108). The Merchant Gateway 310 can determine that Store 1 320 has a maximum capacity of 15 avatars, for example, and that it already has 14 avatars currently in the store. As a result, the Merchant Gateway 310 determines that allowing 2 more avatars to enter the store would violate the store's capacity rule, and thus, the Merchant Gateway 310 can have a Transport Controller 312 transport avatar A 300 and avatar B 302 to Store 3 324, a dynamically-created location that is substantially identical to Store 1 320. (See FIG. 2, Blocks 110, 112).

As FIG. 4 illustrates, after avatars A 300 and B 302 enter Store 3 324, the Merchant Gateway 310 can determine whether to allow avatar C 304 to enter Store 1 320 based on a predetermined capacity rule. (See FIG. 2, Block 108). In this example, the Merchant Gateway 310 determines that Store 1 has capacity for one more avatar, so avatar C 304 is allowed to enter Store 1 320.

In the above embodiments, the various modules are described as software that is implemented by the server/processor to perform the various functions described above. In this instance, the various modules comprise computer code instructions for performing the various translation and display functions discussed above. It is understood, however, that various modules may also be a self contained systems with embedded logic, decision making, state based operations and other functions that may operate in conjunction with a virtual world simulation, such as Second Life.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for avoiding non-intentional separation of avatars in a virtual world, comprising:
   detecting, by a processor, a first avatar seeking to enter a first location;
   querying, by the processor, a friend list of the first avatar;
   comparing, by the processor, the friend list to a group of avatars in the first location;
   notifying, by the processor, at least one of a first user of the first avatar and another user of each avatar of the group of avatars in the first location that are on the friend list of the first avatar about joining the first avatar and each avatar of the group of avatars that are on the friend list in the first location;
   determining, by the processor, a capacity of the first location in response to an indication that the first avatar and each avatar of the group avatars on the friend list of the first avatar wanting to join together;
   providing, by the processor, a second location substantially identical to said first location in response to an indication that the first avatar and each avatar of the group avatars on the friend list of the first avatar wanting to join together and the capacity of the first location being exceeded by joining the first avatar and each avatar of the group of avatars on the friend list; and
   transporting, by the processor, the first avatar and each avatar of the group of avatars on the friend list of the first avatar that want to join together to the second location in response to the capacity of the first location being exceeded by joining the first avatar and each avatar of the group of avatars on the friend list that want to join together.

2. The method of claim 1, wherein providing a second location substantially identical to said first location comprises dynamically spawning a new location substantially identical to the first location.

3. The method of claim 1, further comprising notifying at least one of a user of the first avatar and the other user of each avatar of the group of avatars on the friend list if the avatars are going to be transferred to the second location.

4. The method of claim 1, wherein detecting that the first avatar is seeking to enter the first location comprises determining that the first avatar is within a certain proximity of the first location.

5. The method of claim 4, wherein the certain proximity comprises a user-defined distance.

6. The method of claim 1, further comprising:
   determining that more than one avatar is related to the first avatar and are seeking to enter the first location;
   determining a total number of avatars already in said first location;

determining a maximum capacity of the first location;

determining that allowing the first avatar to enter the first location along with the more than one avatar related to the first avatar which also are seeking to enter the first location would exceed the location's maximum capacity;

providing the second location substantially identical to the first location in response to determining that the maximum capacity of the first location would be exceeded by allowing the first avatar and the more than one avatar related to the first avatar to enter the first location; and transferring the first avatar and the more than one avatar related to the first avatar to the second location in response to determining that the maximum capacity of the first location would be exceeded by allowing the first avatar and the more than one avatar related to the first avatar to enter the first location.

7. The method of claim 1, wherein said first location comprises a virtual store.

8. The method of claim 1, wherein the first location comprises a defined virtual space in the virtual world.

9. A system for avoiding non-intentional separation of avatars in a virtual world, comprising:

a processor;

a module operating on the processor for avoiding non-intentional separation of the avatars in a virtual world, the module being configured to perform a set of functions comprising:

detecting a first avatar seeking to enter a first location;

querying a friend list of the first avatar;

comparing the friend list to a group of avatars in the first location;

notifying at least one of a first user of the first avatar and another user of each avatar of the group of avatars in the first location that are on the friend list of the first avatar about joining the first avatar and each avatar of the group of avatars that are on the friend list in the first location;

determining a capacity of the first location in response to an indication that the first avatar and each avatar of the group avatars on the friend list of the first avatar wanting to join together;

providing a second location substantially identical to said first location in response to an indication that the first avatar and each avatar of the group avatars on the friend list of the first avatar wanting to join together and the capacity of the first location being exceeded by joining the first avatar and each avatar of the group of avatars on the friend list; and transporting the first avatar and each avatar of the group of avatars on the friend list of the first avatar that want to join together to the second location in response to the capacity of the first location being exceeded by joining the first avatar and each avatar of the group of avatars on the friend list that want to join together.

10. A computer program product for avoiding non-intentional separation of avatars, comprising:

a non-transitory computer-useable storage medium having computer useable program code embodied therein, the computer useable medium comprising:

computer useable program code configured to detect a first avatar seeking to enter a first location;

computer useable program code configured to query a friend list of the first avatar;

computer useable program code configured to compare the friend list to a group of avatars in the first location;

computer useable program code configured to notify at least one of a first user of the first avatar and another user of each avatar of the group of avatars in the first location that are on the friend list of the first avatar about joining the first avatar and each avatar of the group of avatars that are on the friend list in the first location;

computer useable program code configured to determining a capacity of the first location in response to an indication that the first avatar and each avatar of the group avatars on the friend list of the first avatar wanting to join together;

computer useable program code configured to provide a second location substantially identical to said first location in response to an indication that the first avatar and each avatar of the group avatars on the friend list of the first avatar wanting to join together and the capacity of the first location being exceeded by joining the first avatar and each avatar of the group of avatars on the friend list; and computer useable program code configured to transport the first avatar and each avatar of the group of avatars on the friend list of the first avatar that want to join together to the second location in response to the capacity of the first location being exceeded by joining the first avatar and each avatar of the group of avatars on the friend list that want to join together.

* * * * *